May 20, 1924.

A. C. HARM

FLEXIBLE ADJUSTABLE COLLAR TOP

Filed Oct. 16, 1922

1,494,541

AUGUST CHARLES HARM   INVENTOR.

BY

*Emil F. Lang*   ATTORNEY

Patented May 20, 1924.

1,494,541

UNITED STATES PATENT OFFICE.

AUGUST C. HARM, OF LINCOLN, NEBRASKA.

FLEXIBLE ADJUSTABLE COLLAR TOP.

Application filed October 16, 1922. Serial No. 595,004.

*To all whom it may concern:*

Be it known that I, AUGUST CHARLES HARM, a citizen of the United States, residing at Lincoln, in the county of Lancaster and State of Nebraska, have invented certain new and useful Improvements in Flexible Adjustable Collar Tops, of which the following is a specification.

Horse collars are made and sold in fixed sizes. In order to make it possible to place them easily on the horse's neck, they are left open usually at the top but sometimes at the bottom and occasionally at both the top and bottom, the meeting edges being connected by means of a separable fastener of any desired type. The collar is not adjustable in size and alone will not fit another horse having a larger or a smaller neck. It is sometimes desirable to adjust the size of the collar even when used on the same horse, as in the springtime when the horse is "soft" through lack of exercise during the winter.

Various devices for making the collar adjustable are at present on the market, but these devices are as a rule awkward and difficult to place on and to remove from the horse. It is my object to provide such a device which is simple in construction and which can be cheaply manufactured, which is neat in appearance when in use, which is not liable to readily get out of order, and which can be expeditiously placed in position or removed when desired.

Having in view these objects and others which will appear in the description, I will now refer to the drawings, in which—

Figure 1:
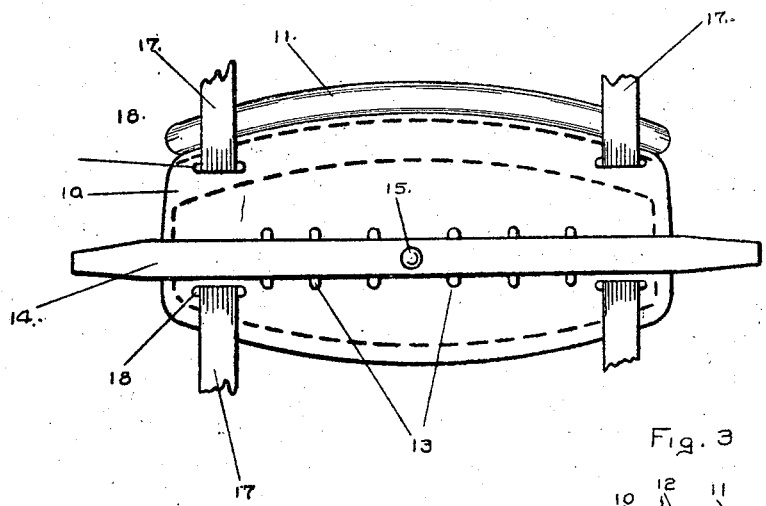
Figure 1 is a plan view of my collar top.

In the drawings, numeral 10 designates the body part of my collar top. In practice by stitching together two or more layers of leather and by rolling one of the edges of the lower layer over the corresponding edge of the upper layer, as shown at 11. This roll 11 is at the back edge when the device is in place on the horse's neck, and serves as an abutment for the hames.

Figure 4:
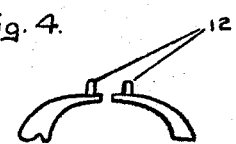
Figure 4 is a detail view of the meeting edges of the horse collar and showing the position of the loops to which my collar top is secured.

Two loops 12, preferably made of malleable iron, constitute part of my device. These loops 12 are secured to the horse collar at equal distances from the end edges, as shown in Figure 4. Elongated apertures 13 are punched in the body part 10 of my collar top. The apertures 13 are just sufficiently large to permit the passage therethrough of the loops 12, and they are arranged in pairs symmetrical with respect to the central point of the body part 10. The billet 14 is secured to the body part 10 at its central point by means of a rivet 15 or other suitable fastening device.

Figure 2:
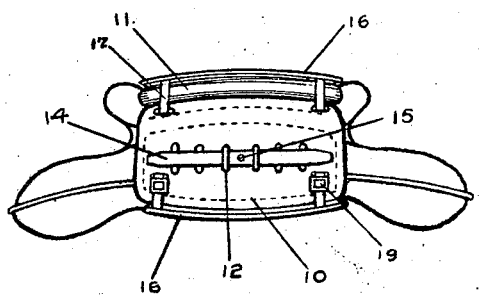
Figure 2 is a view of the collar top similar to the view in Figure 1, the collar top being shown reduced in size, and in place and secured to the horse collar.
Figure 3:
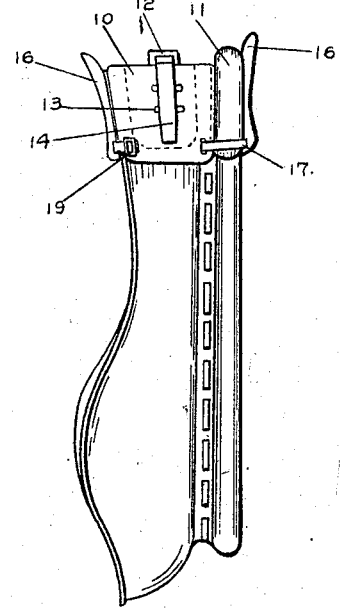
Figure 3 is a side elevation of the horse collar with the collar top in place and secured to the collar.

The regular equipment of the horse collar includes a top pad of heavy leather, which rests on the horse's neck immediately under the joint in the collar and prevents chafing and pinching from the joint. The exposed portions of the top pad are designated in the drawings by the numeral 16. To the rear edge of the top pad 16 and at each end thereof I secure the end of a billet 17. I also provide suitable apertures 18 at each end of the body part 10, and I pass the free end of the billet 17 through the pair of apertures 18 so that the intermediate part of the billet is on the under side of the body part 10. On the edge of the top pad 16 opposite to the connections with the billets 17, I secure buckles and chafes designated generally by the numeral 19. The billets 17 when secured to their respective buckles as shown in Figures 2 and 3, hold the collar top flush against the collar. By means of this construction I entirely eliminate the loose flapping ends which tend to interfere with other parts of the harness, and I give to the assembled structure a neat, finished appearance not found heretofore in similar devices.

The main feature of my invention is of course the specific means varying the size of the collar. When used for the first time, the collar is first placed on the horse's neck with the top pad 16 in place directly under the joint of the collar. The collar is then closed to the desired position, after which my collar top is placed on top of the collar and pressed down to force the loops 12 through a pair of the apertures 13. The ends of the billet 14 are then drawn through the protruding ends of the loops to prevent any displacement of the collar top. The billets 17 are then secured to their respective buckles. When it is desired to remove the collar from the horse, it is only necessary to release one of the billets 17 from its buckle and to draw out the corresponding end of the billet 14 from its loop 12, thus making it possible for that loop to pass out of its aperture 13.

After my collar top has once been adjusted for a given set of conditions, it is not necessary to disturb the adjustment, except to readjust the collar on the same horse for seasonal conditions or to adjust the collar for another horse. Since the billets 14 and 17 are released on only one side when unhitching, the act of placing the collar on or removing it from the horse's neck takes only a moment of time. My collar top has a wide range of adjustability. By its use, it is possible to bring about a variation of three or four sizes in the collar. My collar top has substantially the same form as that of the top pad 16, the result being that the pad 16 follows throughout the entire range of adjustment.

By referring to Figures 1 and 3, it will be seen that the roll 11 of my collar pad is substantially in the vertical plane of the roll of the horse collar, the roll 11 being seated against the upturned rear edge of the top pad 16. The forward edge of the roll 11 is thus in the plane of the rear edge of the hame of the collar and consequently the hame strap at the top of the collar will rest against the roll 11. The hame starp is thus held by the roll 11 against rearward sliding movement and at the same time the projecting loops 12 prevent the forward sliding of the hame strap. It should also be noted that my top pad entirely covers the joint of the collar, thus shedding the water which tends to chafe the horse's neck and to rot the collar. The pad being made of leather or similar flexible but nonresilient material, will cause no binding or pinching of the horse's neck.

I have shown and described my collar top applied to the top of a horse collar because this is the most common use to which it is to be put. It is obvious that in connection with a horse collar which opens at the bottom instead of at the top my device will be equally serviceable, it being necessary only to slightly vary the dimensions and the proportions of the parts.

Having thus described my invention and the manner in which it is to be used, what I believe to be new and desire to secure by Letters Patent of the United States is:—

1. A collar top for horse collars, said collar top being flexible and nonresilient and being adapted to entirely cover the joint of the horse collar, a billet secured at its middle point to the collar top and extending lengthwise of the collar top, said collar top being provided with a plurality of apertures in line with said billet whereby loops secured to the horse collar at the joint thereof may be passed through a pair of apertures and secured by said billet, said loops being adapted also to serve as forward abutments for the hame strap, and an outwardly projecting roll at the rear edge of said collar top, said roll serving as a rear abutment to prevent the rearward sliding of the hame strap.

2. A collar top for horse collars, said collar top being made of a flexible and nonresilient material and having a width which is substantially equal to that of the horse collar at the joint thereof, an upwardly projecting roll at the rear edge of said collar top, said roll being adapted to bear against the rear upstanding flange of the top pad of the horse collar and being adapted also to serve as an abutment to prevent the rearward sliding of the hame strap, and means which are adapted to be secured to the horse collar whereby the said collar top may be releasably and adjustably secured to the horse collar, said means being also adapted to prevent the forward sliding of the hame strap.

3. A flexible collar top which is adapted to be secured to the outer side of a horse collar, said collar top being flexible but nonresilient and being adapted to entirely cover the joint of the horse collar, a pair of loops which are adapted to be secured to the horse collar, a pair of billets which are adapted to be secured to the top pad of the horse collar and which are further adapted to secure the ends of said collar top in contact with the horse collar, said collar top having a pair of elongated apertures at each of its ends and in line with the respective billet, whereby each of said billets may be drawn through a pair of apertures, and a billet secured to said collar top at its middle point and extending longitudinally of the collar top in both directions from its securing point, said collar top being provided with a series of pairs of elongated apertures, the series of apertures being in line with said last named billet, the arrangement being such that after adjustment of the horse collar the loops may be drawn through a pair of said last mentioned apertures to project beyond the outer surface of the collar top, whereupon the opposite ends of said last named billet may be drawn through the projecting portions of the loops to hold the collar top secured to the horse collar.

In testimony whereof I affix my signature.

AUGUST C. HARM.